United States Patent
Fischer et al.

(10) Patent No.: US 9,774,584 B2
(45) Date of Patent: Sep. 26, 2017

(54) AUTHENTICATION OF A FIRST DEVICE BY A SWITCHING CENTER

(71) Applicant: SIEMENS AKTIENGESELLSCHAFT, München (DE)

(72) Inventors: Kai Fischer, Baldham (DE); Steffen Fries, Baldham (DE); Jürgen Gessner, Forstinning (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/424,354

(22) PCT Filed: Jun. 21, 2013

(86) PCT No.: PCT/EP2013/062970
§ 371 (c)(1),
(2) Date: Feb. 26, 2015

(87) PCT Pub. No.: WO2014/032828
PCT Pub. Date: Mar. 6, 2014

(65) Prior Publication Data
US 2015/0215301 A1    Jul. 30, 2015

(30) Foreign Application Priority Data

Aug. 27, 2012 (DE) .................. 10 2012 215 167

(51) Int. Cl.
*G06F 7/04* (2006.01)
*H04L 29/06* (2006.01)
(Continued)

(52) U.S. Cl.
CPC ............ *H04L 63/08* (2013.01); *H04L 9/3268* (2013.01); *H04L 63/0823* (2013.01);
(Continued)

(58) Field of Classification Search
None
See application file for complete search history.

(56) References Cited

U.S. PATENT DOCUMENTS

2004/0214572 A1* 10/2004 Thompson .......... H04L 12/1464
455/435.2
2004/0215968 A1* 10/2004 Rodwell ................ G06F 21/32
713/186

(Continued)

FOREIGN PATENT DOCUMENTS

| CN | 101213817 A | 7/2008 |
| CN | 101888388 A | 11/2010 |

(Continued)

OTHER PUBLICATIONS

Cooper D. et al: Internet X.509 Public Key Infrastructure certificate and Certificate Revocation List (CRL) Profile, RFC 5280, May 2008.

(Continued)

*Primary Examiner* — Brandon Hoffman
(74) *Attorney, Agent, or Firm* — Lempia Summerfield Katz LLC

(57) ABSTRACT

A method, a first device, and a switching center are described. A first device is authenticated by a switching center inside a network taking into account the use of additional (e.g., virtual) network interfaces. A device uses certificates to transfer additional MAC addresses for authentication. As a result, a device having a plurality of MAC addresses gains access to a network from a plurality of MAC addresses in a one-off authentication process.

19 Claims, 1 Drawing Sheet

(51) Int. Cl.
 *H04W 12/06* (2009.01)
 *H04L 9/32* (2006.01)
 *H04W 88/04* (2009.01)
 *H04L 29/12* (2006.01)

(52) U.S. Cl.
 CPC ......... *H04L 63/0876* (2013.01); *H04W 12/06* (2013.01); *H04L 61/6022* (2013.01); *H04W 88/04* (2013.01)

(56) References Cited

U.S. PATENT DOCUMENTS

| | | | |
|---|---|---|---|
| 2008/0155094 A1 | 6/2008 | Roese et al. | |
| 2010/0110975 A1 | 5/2010 | Cagenius | |
| 2010/0185864 A1* | 7/2010 | Gerdes, Jr. | H04L 9/3213 713/175 |
| 2010/0242092 A1* | 9/2010 | Harris | H04L 63/08 726/3 |
| 2010/0290391 A1* | 11/2010 | Cheng | H04L 29/12254 370/328 |
| 2011/0154443 A1* | 6/2011 | Thakur | G06F 21/41 726/3 |

FOREIGN PATENT DOCUMENTS

| | | |
|---|---|---|
| EP | 2075959 A1 | 7/2009 |
| WO | WO2007004921 A1 | 1/2007 |
| WO | WO2009083430 A1 | 7/2009 |

OTHER PUBLICATIONS

Forsberg D. et al: Protocol for Carrying Authentication for Network Access (PANA), RFC 5191, May 2008.

German Office Action for German Application No. 10 2012 215 167.2, mailed May 8, 2013, with English Translation.

IEEE Std 802.1X™-2004, IEEE Standard for Local and metropolitan area networks, Port-Based Network Access Control, Dec. 13, 2004.

PCT International Search Report and Written Opinion of the International Searching Authority dated Oct. 10, 2013 for corresponding PCT/EP2013/062970.

Pingping L. et al: A Novel SeND Based Source Address Validation Mechanism (SAVM-SeND), 2009 Ninth Annual International Symposium on Applications and the Internet, IEEE, Piscataway, NJ, pp. 149-152, ISBN: 978-1-4244-4776-3, DOI: 10.1109/SAINT.2009.80, XP031524660, Jul. 20, 2009.

Chinese Office Action for related Chinese Application No. 201380045224.8 dated Nov. 15, 2016, with English Translation.

* cited by examiner

AUTHENTICATION OF A FIRST DEVICE BY A SWITCHING CENTER

RELATED APPLICATIONS

This application claims the benefit of German Patent Application No. DE 102012215167.2, filed Aug. 27, 2012. The entire contents of the priority document are hereby incorporated herein by reference.

TECHNICAL FIELD

The present teachings relate generally to a method, a first device, and a switching center for authenticating a first device by a switching center inside a network.

BACKGROUND

To gain access to a physical network, devices are authenticated by a superordinate entity. Authentication may be carried out with the IEEE 802.1X standard. Authentication may be carried out by an IEEE 802.1X-enabled switch, and the devices may be connected to the port of the IEEE 802.1X-enabled switch. The devices are identified by a Media Access Control address (MAC) address. As soon as a switch detects an unknown MAC address at a port or a physical connection has been interrupted, the associated device is re-authenticated, or the device is re-authenticated by the switch.

Virtualization solutions may be used not only in a server environment but also in the client area, thereby resulting in a client device having virtual interfaces with additional MAC addresses in addition to the physical network interfaces.

IEEE 802.1X-enabled switches that support multi-host authentication are known. Only the first access operation is authenticated. All other devices or virtual network interfaces connected to the same port of the switch may not be additionally authenticated.

IEEE 802.1X-enabled switches that support multi-domain authentication are also known. Each device or each network interface—including virtual network interfaces—is re-authenticated since virtual MAC addresses that may be seen in the physical network are unknown to the switch.

Similarly, in the automation environment, profinet devices may have a device-specific MAC address in addition to a MAC address for each network interface.

SUMMARY AND DESCRIPTION

The scope of the present invention is defined solely by the appended claims, and is not affected to any degree by the statements within this summary.

The present embodiments may obviate one or more of the drawbacks or limitations in the related art. For example, in some embodiments, a simplified authentication process inside networks is provided. The simplified authentication process takes into account the use of additional network interfaces.

The advantages described herein may be achieved by one or more individual embodiments of the present teachings.

In accordance with the present teachings, a method for authenticating a first device by a switching center inside a network has the following acts:

The first device transmits a first identifier to the switching center in an identity region of a data structure. The first device transmits at least one additional identifier to the switching center in an extended identity region of the data structure. The switching center authenticates the first device based on the transmitted first identifier and the transmitted additional identifier.

Devices that are authenticated by the switching center according to the above-described method further indicate the network interfaces that are also to be authenticated. Therefore, the first device inside the network is authenticated only once based on the first device's physical network interface. At the same time, the first device indicates the additional network interfaces that are also to be authenticated.

Thus, other devices or their virtual network interfaces that are connected to the same port of the switch may be authenticated as desired. Authentication is carried out for each device in a one-off authentication process wherein access to a network from a plurality of network interfaces is authorized.

In some embodiments, the first device transmits a first media access control address belonging to a physical network interface as the first identifier, and transmits an additional media access control address belonging to a virtual network interface or a second media access control address belonging to the physical network interface as the additional identifier.

The network interfaces may be specified by the MAC addresses. Therefore, both a MAC address belonging to a virtual network interface and a second MAC address that is assigned to a physical network interface in addition to the first MAC address may be concomitantly included in the authentication process.

In some embodiments, the data structure is in the form of a certificate wherein at least one additional media access control address is indicated in the extended identity region with the aid of a placeholder.

An entry with a placeholder may be used in a certificate to indicate a certain range of addresses for which authentication is to be carried out. For example, identification may be carried out for all addresses with a given ending if, through the use of a placeholder in the front part of the address, the front part of the address is not specified. However, the first three bytes of a total of six bytes may also remain fixed, for example, as the manufacturer identifier. The additional three bytes that may be freely selected by the manufacturer may be varied for additional MAC addresses. The last byte may contain a device version and a multiplicity of device versions may be included using a placeholder. A placeholder may include devices from a given build year and onward.

In some embodiments, at least one additional media access control address is produced by replacing a manufacturer identifier inside the media access control address by a mask.

A MAC address structure may be provided wherein virtual MAC addresses are produced by overwriting the manufacturer identification number in the first three bytes of the six bytes of the MAC address. The last three bytes are specific to the physical network card and are used as the basis for identification. Individual bytes of the MAC address (e.g., the manufacturer bytes) may be overwritten during configuration by a mask.

In some embodiments, the data structure is in the form of a certificate, wherein an Internet protocol address that corresponds to an additional media access control address is transmitted as the additional identifier in the extended identity region.

If a MAC address is part of an Internet protocol version 6 address (IPv6 address), an IP address may be indicated in the certificate as an additional identifier for each additional virtual network interface.

In some embodiments, the data structure is in the form of a device certificate or an attribute certificate.

By using a device certificate (e.g., an X.509 device certificate) according to the RFC 5280 standard, all alternative identities that are transmitted as the additional identifier may be indicated in an extended identifier. Thus, an assignment to the device that is authenticated using the device certificate is immediately given.

If the additional identifier is transmitted in the extended identity region of an attribute certificate, a certificate may be issued during production of the device. The MAC address is stored in the certificate, and the MAC address is subsequently supplemented with additional virtual addresses during operation of the device regardless of whether or how many addresses are required. Thus, production and subsequent use may be effectively separated.

In some embodiments, the data structure is in the form of a device certificate or an attribute certificate that is protected from manipulation by the signature of a trusted certification authority.

A high standard of security may be provided when authenticating virtual network interfaces or physical network interfaces and their respective addresses.

In some embodiments, at least one second device inside the network is authenticated by the switching center using above-described acts in accordance with the present teachings.

If there are two or more devices in a network that are authenticated for the purpose of accessing the network, the authentication method is carried out separately for each device inside the network. An authentication method is carried out for each physical device or each physical network interface.

In some embodiments, the first device is granted access to the network by the switching center after the first device has been successfully authenticated by the switching center. Thus, a device may access the network via a network interface only when an authentication method in accordance with the present teachings has previously been run through and the device has been authenticated.

In some embodiments, the second device is granted access to the network by the switching center after the second device has been successfully authenticated by the switching center.

The authorization act that grants the device being authorized access to the network is carried out for each device. A device is granted access to the network using a plurality of network interfaces or addresses in a one-off authentication process without multiple authentications. Separate authentication and corresponding separate authorization of the devices are carried out if the devices are connected in series. As a result, security standards may be preserved that prescribe separate authentication and authorization for each device.

In some embodiments, a first device for authentication inside a network is provided. The first device communicates a first identifier to a switching center in an identity region of a data structure. The first device transmits at least one additional identifier to the switching center in an extended identity region of the data structure.

In some embodiments a switching center is provided. The switching center authenticates a first device based on a first identifier transmitted by the first device and at least one additional identifier transmitted by the first device.

DETAILED DESCRIPTION

Figure 1:
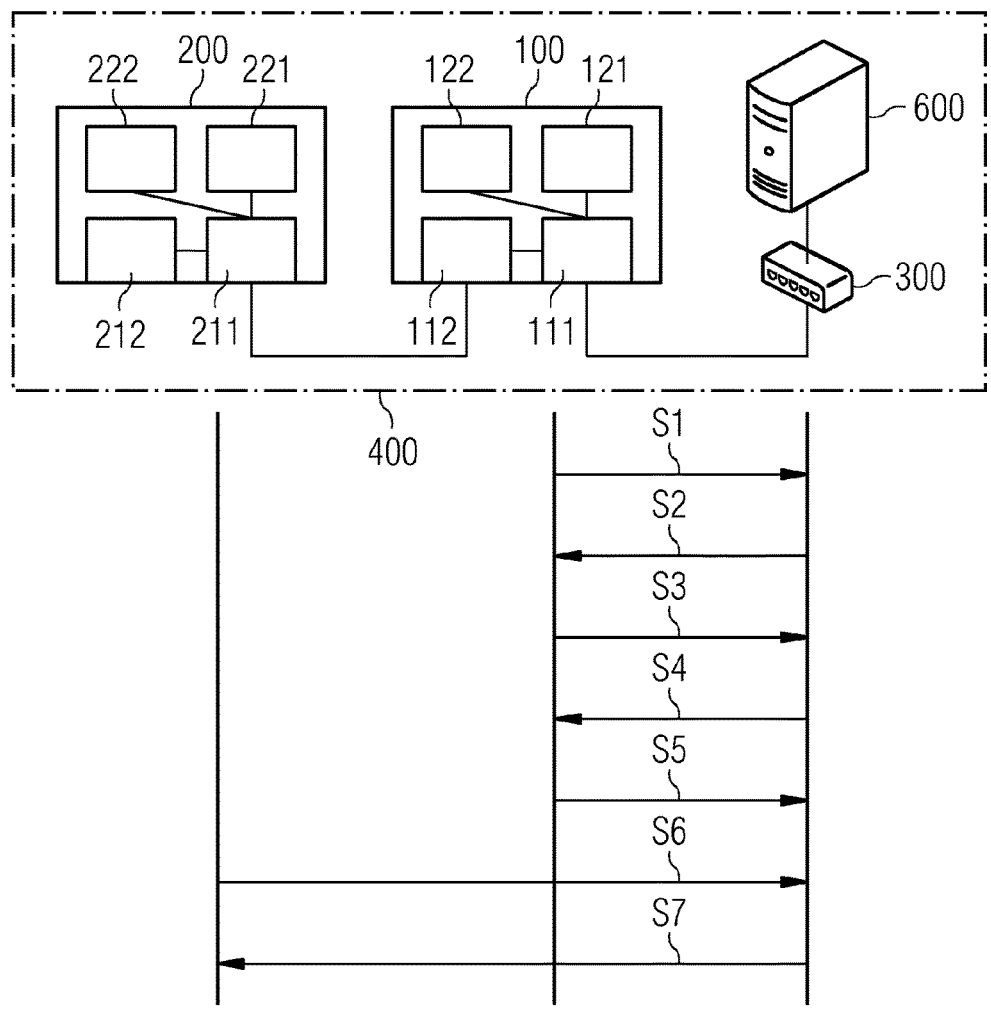
FIG. 1 shows a schematic illustration of an exemplary arrangement of components, and exemplary acts in a method in accordance with the present teachings.

FIG. 1 shows a first device 100 and a second device 200 connected in series in a network 400 of an industrial automation installation. The first device 100 and the second device 200 are connected to a common port of a switching center that is implemented, for example, by a switch 300. In such a linear topology, both the first device 100 and the second device 200 may be authenticated separately.

In a first act S1, the first device 100 attempts to access the network 400 with a first media access control address (MAC address) 111 that specifies a physical network interface of the first device 100. The first MAC address 111 has not yet been authenticated at the switch 300, and the switch 300 transmits a request for authentication in a second act S2. The first device 100 transmits a first identifier to the switch 300 in a third act S3 in an identity region 510 of a data structure that may be implemented by a certificate 500. The certificate 500 is shown schematically in FIG. 2. In addition, the first device 100 indicates a first additional identifier 112, a second additional identifier 121, and a third additional identifier 122 in an extended identity region 520.

A MAC address for a physical network interface may be subdivided into three address regions: a front address region for the manufacturer's identifier and for the device's identifier; a middle address region indicating the network interface as the physical network interface; and a rear address region indicating, respectively, the different MAC addresses for each physical network interface and each device.

Thus, a virtual network interface has a middle address region indicative of a virtual network interface, a front address region for the manufacturer, and a rear address region that indicates the respective virtual network interface for each device.

A MAC address of the form 00-30-05-5A-DB-A0 has six bytes. The first three bytes are used as manufacturer bytes and include, inter alia, the manufacturer identification number. The following two bytes include the device identification number and may distinguish between a MAC address assigned to a virtual network interface and a MAC address assigned to a physical network interface. The last byte uses an included version number or a device build year to indicate the network interface (in other words, each available network interface, whether virtual or physical, has an indicating ending).

In addition to the first identifier 111, the first device also transmits the first additional identifier 112, the second additional identifier 121, and the third additional identifier 122 in the certificate 500. The first device has a second MAC address (first additional identifier 112) that belongs to the physical network interface, and two additional MAC addresses (second additional identifier 121 and third additional identifier 122) that belong to two virtual network interfaces.

In a fourth act S4, the switch 300 verifies the certificate 500 presented by the first device 100 with the aid of an authentication server 600, and authenticates the first device after successful verification. In a fifth act S5, the first device 100 is granted access to the network 400 from all network interfaces and with all MAC addresses.

If a second device 200 attempts to access the network in a sixth act S6 using a first secondary device identifier 211, the first secondary device identifier 211 being in the form of a first secondary device MAC address and belonging to a physical network interface of the second device 200, the switch 300 transmits a request for authentication in a seventh act S7 since this MAC address has not yet been authenticated by the switch.

The authentication process according to the third act S3, the fourth act S4, and the fifth act S5 takes place in a similar manner for the second device 200.

Thus, for a switch 300 that is used for a network in an automation installation, each device in a plurality of devices connected in series is individually authenticated.

Figure 2:
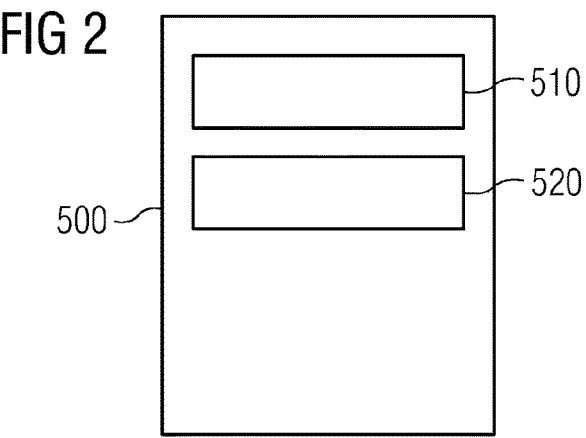
FIG. 2 shows a schematic illustration of an exemplary data structure in accordance with the present teachings.

FIG. 2 shows a schematic illustration of a data structure 500 having an identity region 510 and an extended identity region 520. Authentication is carried out by the switch 300 according to the IEEE 802.1X standard. The first device 100 transmits a device certificate according to the X.509 standard (e.g., RFC 5280) for authentication.

The additional MAC addresses (second additional identifier 121 and third additional identifier 122) and the second MAC address (first additional identifier 112) of the first device 100 may be implemented using an extension "SubjectAltName" according to RFC 5280 by an entry "other name." There is a large degree of freedom during naming and a list of the additional MAC addresses (second additional identifier 121 and third additional identifier 122) or the second MAC address (first additional identifier 112) may be stored. The first device 100 creates a list of all MAC addresses for the first device's network interfaces. The first MAC address 111 may also be described in "SubjectAltName." Thus, the logical separation between the identity region 510 and the extended identity region 520 may be technically implemented by a common entry.

For authentication, the second device 200 transmits an attribute certificate according to X.509. In the extension of the attribute certificate, a range of addresses for which authentication is to be simultaneously carried out is indicated as "other name" with the aid of a placeholder. Due to the placeholder (e.g., a wildcard), an address region of a definite or indefinite length may be read in any desired manner. No further authentication is needed in a request for access to the network 400 by the second device 200 using a first additional secondary device identifier 221, a second additional secondary device identifier 222, and a third additional secondary device identifier 212. The first additional secondary device identifier 221, the second additional secondary device identifier 222, and the third additional secondary device identifier 212 may be in the form of an additional secondary device MAC address in the region encompassed by the placeholder. The second device 200 transfers the first secondary device MAC address 211 in a form wherein only the manufacturer bytes and a device identifier are explicitly indicated. The last byte or the ending is kept open using a placeholder: 00-30-05-5A-DB-*.

The above-described approach may be carried out separately for the virtual and physical network interfaces. Additional secondary device MAC addresses (first additional secondary device identifier 221, the second additional secondary device identifier 222) may be encompassed by a MAC address with a placeholder belonging to a virtual network interface, and a second secondary device MAC address 212 may be encompassed by a MAC address with a placeholder (e.g., with different device identifier bytes) belonging to a physical network interface.

In addition to being used for authentication according to the IEEE 802.1X standard, a method in accordance with the present teachings may be used for authentication based on an Internet protocol connection. Authentication based on an Internet protocol connection may be carried out, for example, as part of network access authentication using the Protocol for Carrying Authentication for Network Access (PANA) according to the Request for Comment 5191 (RFC 5191). In a layer model (e.g., the Open Systems Interconnection Reference Model or OSI layer model), authentication using PANA is carried out at a higher level than using IEEE 802.1X. The transmitted information (e.g., the identifiers described in exemplary embodiments) is processed in a similar manner to the processing according to IEEE 802.1X on the network layer.

The first device 100 and the switching center 300 may be realized and implemented using software, hardware, or a combination of software and hardware.

The acts carried out by the units may be stored as program code on a storage medium (e.g., a hard disk, a CD-ROM or a storage module). The individual instructions of the program code may be read and processed by at least one computing unit of the first device 100 and/or of the switching center 300 including a processor.

The processor is connected to the storage medium via a bus for the interchange of data.

An input/output unit may be connected via the bus. Data (e.g., messages) may be received and/or transmitted using the input/output unit.

The above-described embodiments may be freely combined with one another.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether independent or dependent—and that such new combinations are to be understood as forming a part of the present specification.

The invention claimed is:

1. A method for authenticating a first device by a switching center inside a network, the method comprising:
   receiving, by the switching center from the first device, a first identifier in an identity region of a data structure and at least one additional identifier in an extended identity region of the data structure;
   authenticating, by the switching center, the first device based on the first identifier and the at least one additional identifier in a one-off authentication process; and
   granting, by the switching center, the first device access to the network such that a plurality of network interfaces identified by the first identifier and the at least one additional identifier are granted access in the one-off authentication process without multiple authentications.

2. The method of claim 1, wherein the first identifier comprises a first media access control address belonging to a physical network interface, and
wherein the at least one additional identifier comprises at least one additional media access control address belonging to a virtual network interface or a second media access control address belonging to the physical network interface.

3. The method of claim 2, wherein the data structure comprises a device certificate or an attribute certificate.

4. The method of claim 2, wherein the data structure comprises a device certificate or an attribute certificate, wherein the device certificate or the attribute certificate is protected from manipulation by a signature of a trusted certification authority.

5. The method of claim 2, wherein the data structure comprises a certificate, and
wherein the at least one additional media access control address or the second media access control address in the extended identity region is indicated in the certificate via a placeholder.

6. The method of claim 5, further comprising producing the at least one additional media access control address or the second media access control address by replacing a manufacturer identifier inside the first media access control address by a mask.

7. The method of claim 5, wherein the data structure comprises a device certificate or an attribute certificate.

8. The method of claim 5, wherein the data structure comprises a device certificate or an attribute certificate, wherein the device certificate or the attribute certificate is protected from manipulation by a signature of a trusted certification authority.

9. The method of claim 2, further comprising producing the at least one additional media access control address or the second media access control address by replacing a manufacturer identifier inside the first media access control address by a mask.

10. The method of claim 9, wherein the data structure comprises a device certificate or an attribute certificate.

11. The method of claim 9, wherein the data structure comprises a device certificate or an attribute certificate, wherein the device certificate or the attribute certificate is protected from manipulation by a signature of a trusted certification authority.

12. The method of claim 1, wherein the data structure comprises a certificate, and
wherein the at least one additional identifier in the extended identity region is an Internet protocol address, wherein the Internet protocol address comprises at least one additional media access control address or a second media access control address as a component.

13. The method of claim 12, wherein the data structure comprises a device certificate or an attribute certificate.

14. The method of claim 1, wherein the data structure comprises a device certificate or an attribute certificate.

15. The method of claim 1, wherein the data structure comprises a device certificate or an attribute certificate, wherein the device certificate or the attribute certificate is protected from manipulation by a signature of a trusted certification authority.

16. The method of claim 1, further comprising:
receiving, by the switching center from a second device, a second identifier in the identity region of the data structure;
receiving, by the switching center from the second device, at least one additional second identifier in the extended identity region of the data structure; and
authenticating, by the switching center, the second device based on the transmitted second identifier and the transmitted at least one additional second identifier.

17. The method of claim 16, further comprising granting, by the switching center, the second device access to the network after the second device has been successfully authenticated by the switching center such that a plurality of network interfaces identified by the second identifier and the at least one additional second identifier are granted access in the one-off authentication process without multiple authentications.

18. A first device configured for authentication inside a network, the first device being configured to:
transmit a first identifier to a switching center in an identity region of a data structure; and
transmit at least one additional identifier to the switching center in an extended identity region of the data structure,
wherein the switching center is configured to authenticate the first device based on the transmitted first identifier and the transmitted at least one additional identifier in a one-off authentication process such that a plurality of network interfaces identified by the first identifier and the at least one additional identifier are granted access in the one-off authentication process without multiple authentications.

19. A switching center, wherein the switching center is configured to:
receive, from a first device, a first identifier in an identity region of a data structure;
receive, from the first device, at least one additional identifier in an extended identity region of the data structure;
authenticate the first device based on the first identifier transmitted by the first device and the at least one additional identifier transmitted by the first device in a one-off authentication; and
grant the first device access to the network such that a plurality of network interfaces identified by the first identifier and the at least one additional identifier are granted access in the one-off authentication process without multiple authentications.

* * * * *